Patented May 16, 1944

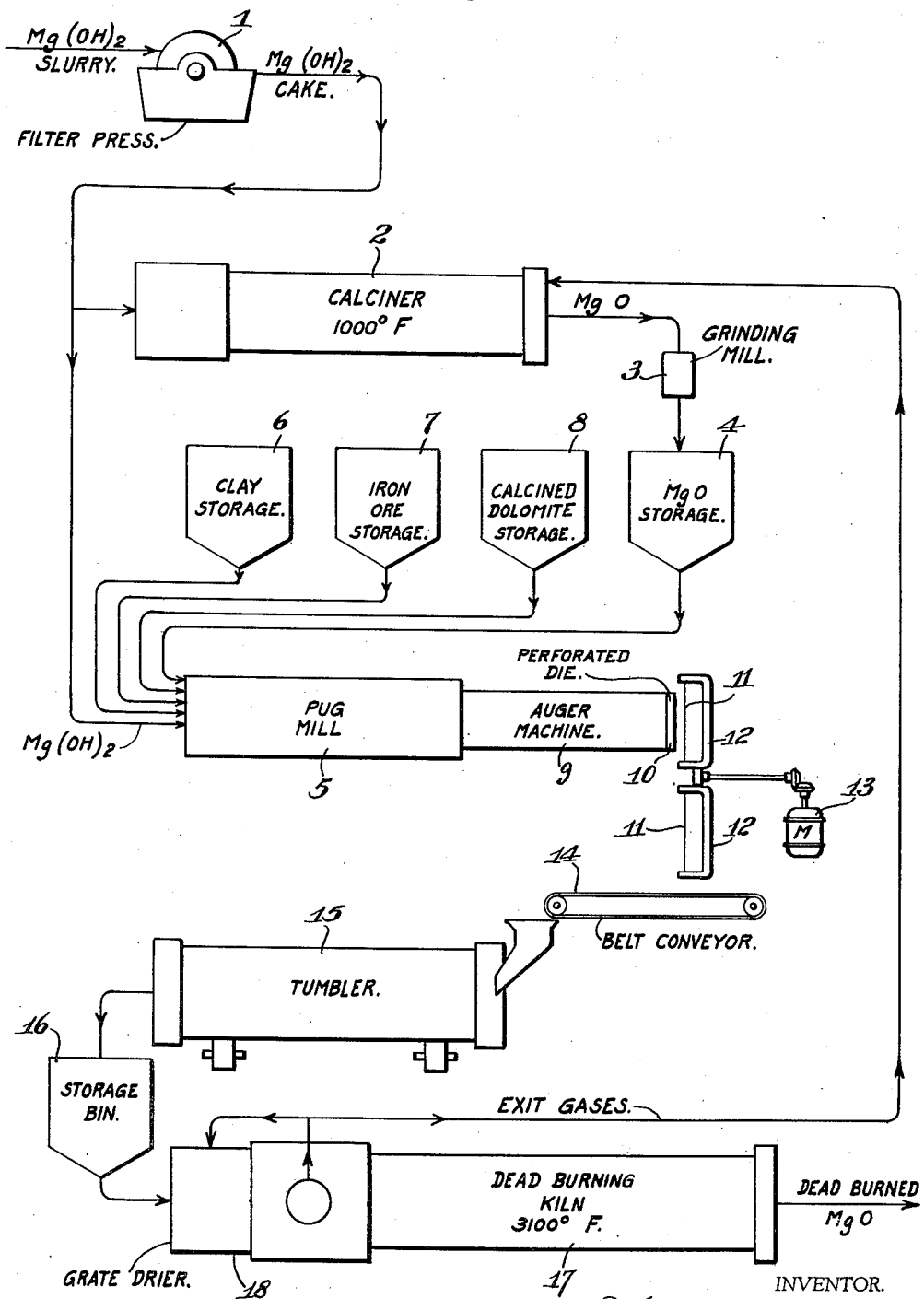

2,348,847

UNITED STATES PATENT OFFICE 2,348,847

DEAD BURNED MAGNESIA

Robert D. Pike, Pittsburgh, Pa., assignor to Harbison-Walker Refractories Company, Pittsburgh, Pa., a corporation of Pennsylvania Application September 6, 1941, Serial No. 409,849

9 Claims. (Cl. 23—201)

This invention relates to the production of dead burned magnesia from precipitated magnesium hydrate. The term "dead burned" as used herein has the same connotation as when it is used with reference to magnesite.

Dead burned magnesite grain used for the making of refractory bricks should have an apparent density, known as grain density, determined on particles between 3- and 4-mesh size, of about 3.10 to 3.20, and a magnesia (MgO) content preferably not less than about 92 per cent. It has been proposed to make dead burned magnesia from precipitated magnesium hydrate

[$Mg(OH)_2$]

but up to the present time it has not been possible to obtain such densities with such materials unless they are burned at excessively high temperatures, e. g., above about 3350° F., or in the electric furnace, and such procedures either are not practical or are not economical. Precipitated magnesium hydrate slurry when burned in a rotary kiln has a grain density less than 3.0 so that it is unsatisfactory for brick making despite its favorable content of magnesium. Consequently all of the dead burned magnesia for brick making has preferably been derived from magnesite rock.

An object of this invention is to produce dead burned magnesia from precipitated magnesium hydrate by a process which is simple, efficient, readily practiced with standard and ordinarily available apparatus, and is economical, and which produces burned magnesia of greater density than has resulted heretofore by applying the same temperatures to the hydrate, the density and analysis of the product being such as to fit it for refractory uses, particularly for making magnesite brick.

A particular object is to provide a process of producing dense dead burned magnesia grain from precipitated magnesium hydrate by a process in which the material is calcined at a temperature not over about 3100° F.

A special object is to produce from precipitated magnesium hydrate dead burned magnesia containing at least about 92 per cent of magnesia and having a grain density of at least about 3.15.

Still another object is to provide magnesium hydrate in the form of strong, dense autogenously bonded granules.

Further objects will appear from the following specification.

The invention may be described with particular reference to the accompanying drawing which is a flow sheet representing the preferred practice of the invention.

The invention is predicated upon my discovery that magnesium hydrate made by the process disclosed in my copending application Serial No. 402,935, filed July 18, 1941, and similar materials, when calcined lightly, say at not over about 1000° F., produce magnesia which is highly reactive chemically.

The process of my aforesaid copending application involves the production of magnesium hydrate and calcium carbonate from dolomite, and basically it involves two steps. First, calcined and hydrated dolomite is treated with a magnesium chloride brine to precipitate magnesium hydrate and produce a brine containing calcium chloride. In the second stage a further amount of calcined and hydrated dolomite is treated with the calcium chloride brine from the first stage and with carbon dioxide to precipitate chalk and reform a magnesium chloride brine which is recycled for use in the first stage. Those reactions are broadly old but through my discovery of the importance of certain factors and correlation of factors, my process results in the production of a rapid settling and easily filterable magnesium hydrate.

As described in the said application, the dolomite is calcined at a temperature such as to convert the calcium and magnesium carbonates to oxides but such that the lime is highly active, i. e., slakes rapidly and vigorously. The magnesia will also slake quite rapidly, but less so than the lime. The hydration step is critical in that process, it being important to produce a dry hydrated product of which at least about 50 to 60 per cent is granular, by which I refer to particles larger than 325 mesh, and most suitably larger than 200 mesh, but advantageously not appreciably greater than 65 mesh. In accordance with that invention the calcined dolomite is dry hydrated with a calcium chloride brine which is free, or substantially free, from magnesium chloride. The concentration of this brine is critical, and it should be from about 1.05 to 1.08 specific gravity at ordinary room temperature. The amount of brine used should not greatly exceed the amount necessary for hydration of the calcium oxide so that the product will be dry and granular. Using a brine of the concentration stated, it suffices ordinarily to hydrate the dolomite with about 38 to 40 per cent by weight of that brine. The product will be dry and granular, the lime will be completely hydrated, and about 17 to 18 per cent of the magnesia will be hydrated.

The dry hydrated material is then preferably creamed with a further amount of the same calcium chloride brine to produce a lump-free slurry.

The cream thus produced is then ready for reaction with the magnesium chloride brine, whereby magnesium hydrate is precipitated and a calcium chloride brine is formed. In this step the amount of brine used should be not less than about 105 per cent of the amount theoretically necessary, and it may satisfactorily be considerably in excess of that value. This brine results from the second stage of the process, as noted hereinabove, and as produced in the second stage it will contain some amount of magnesium chloride. As ordinarily regenerated in the second stage it will carry about 11 per cent of magnesium chloride and about 3 per cent of calcium chloride, and the brine should have a specific gravity of about 1.10 to 1.14, which is an important factor in producing a hydrate that settles rapidly and filters easily. A particularly important factor in producing hydrate having such properties is that the brine used for precipitating the hydrate be at a temperature not over about 60° F., and most suitably not over about 55° F., and further that the rise in temperature in the precipitator should be limited to a maximum of about 4° to 6° F. The magnesium hydrate thus produced settles rapidly and filters easily. I make use in the present invention of the high degree of reactivity of MgO produced by light calcining of hydrate produced as just described, having discovered further that when this highly reactive magnesia is mixed with the uncalcined magnesium hydrate a strong reaction sets in which liberates heat and converts the mixture to a hard mass of relatively dry hydrated magnesia. The mixture is formed into nodules, grains, pellets, or similar shapes prior to initiation of that reaction, and the heat evolved in the reaction so hardens the nodules, or granules, that thereafter they may be handled freely with substantially no proportion of dust being formed. After the nodules have become dried and hardened they are then burned to produce dead burned magnesia, suitably by passing them through a rotary kiln.

There may be added to the mixture of reactive magnesia and uncalcined magnesium hydrate the correcting materials which are commonly combined with magnesites to confer special properties upon the dead burned grain. These materials and their functions are well understood in the art, but it may be said that generally clay and iron ore are added for this purpose, as well as calcined dolomite where it is desired to increase the lime content.

In the practice of the invention, therefore, precipitated magnesium hydrate, suitably in the form of a wet filter cake, is divided into two portions. One portion is calcined at a temperature not over about 1000° F., to produce magnesia which is so highly reactive that it slakes readily. The calcined material is ground, if need be, advantageously so that most of it will pass a 100-mesh screen, and it is then mixed with the other portion of magnesium hydrate, which is uncalcined. The proportions in which the two are mixed will vary in accordance with such factors as the particular density required and the character of the magnesium hydrate, but for the most part it will depend on the moisture content of the hydrate, the amounts of correcting materials added, the manner of mixing and the water content of the mixture needed for proper handling, or shaping, into nodules. It will be seen, therefore, that exact limits on the proportions of the two can not be set. However, using the hydrate cake described in my aforesaid copending application I now prefer to subject about fifty to sixty-five per cent of the filter cake to calcining to produce reactive magnesia. The critical factor here is that the mix shall be of a consistency suited to the production of dense nodules.

The calcined and uncalcined hydrates are then mixed and nodulized. It is of great advantage to have the nodules dense so that usually the mixture is made to the consistency of the "stiff mud" used in extruding ordinary clay brick with an auger machine. The mix is then formed in any suitable manner into shapes of desired size, which for many purposes may be from ½ to ¾ inch in diameter. The reaction is then permitted to take place with concurrent drying and hardening of the nodules. After the reaction they are strong enough and hard enough to permit free handling and form a suitable feed for calcining to the dead burned state, as in a rotary kiln. The nodules may lose some of their strength and hardness in the vicinity of 1400° to 1600° F. while passing through the dead burning kiln, but they do not break up to any great extent under the influence of the tumbling action in the kiln, and practically no dust is produced in the burning operation. The dead burning is effected at a maximum temperature of about 3100° F. The nodules of dead burned magnesia delivered from the kiln have a grain density that is satisfactory for refractory purposes. This material may be crushed to yield hard, clean and granular grains practically free from dust.

Although it is not necessary, the hardened and dried nodules are preferably heated further before going to the dead burning kiln to further reduce their water content, which will advantageously be not over about 0.2 pound per pound of solids.

Although it is not known with certainty why an exothermic reaction occurs between the lightly calcined magnesia and the magnesium hydrate, or why the product of that reaction produces satisfactorily dense magnesia upon dead burning at temperatures as low as 3100° F., whereas the density is unsatisfactory when magnesium hydrate is burned by prior procedures, even at much higher burning temperatures, I now believe that the reasons are as follows: The hydrate produced by the process of my aforesaid copending application usually contains a small amount of calcium and magnesium chlorides, and I believe that the latter reacts with the highly reactive calcined magnesia and thus to some extent acts to harden the nodules. Most likely, however, the principal reaction involved is a re-conversion of the highly reactive magnesia with the water of the uncalcined hydrate to form a magnesium hydrate. This reaction occurs so rapidly and completely as to release much heat and thereby to dry and harden the nodules.

Based upon actual performance of the process a heat balance shows that work to the extent of 32,000 B. t. u. is done in this reaction, which is several times the amount of heat that would be expected. Thus, using the best data available, the heat of the reaction $$MgO + H_2O = Mg(OH)_2$$

would be 14,500 B. t. u. using the data for brucite, and only 7000 B. t. u. based upon the data for the amorphous state, which is what would ordinarily be used in determining the heat effect of this reaction.

This heat effect is so much greater than would be expected as to be remarkable, but it indicates that the process involves factors not known heretofore. The only explanation of the release of several times the amount of heat theoretically available from the ordinary hydration of MgO that seems likely is that a stable form of a higher hydrate, $MgO.xH_2O$, has been formed. This reaction between reactive lightly calcined magnesia, water and precipitated magnesium hydrate, with or without the presence of magnesium chloride, to release heat and to cause a hard, rapid set, is, I believe, therefore new in the art.

I have discovered further that the release of heat in this reaction is more pronounced where small amounts of clay, iron ore and the like agents for correcting the analysis of the magnesia are present. Although the exact reason is not understood why that is so, it may be that such additions act as catalysts for forming of the stable form of higher hydrated magnesia just referred to.

Furthermore, in the usual practice of making dead burned magnesia from precipitated magnesium hydrate, there is fed to the kiln a slurry of the hydrate. When burned at about 3100° F. the grain density is only about 2.8 to 2.9, which is too low to be suitable for making brick. I believe that this is due to the fact that the slurry fed to the kiln contains about three to four pounds of water per pound of solids so that the evaporation of the water as the material passes through the kiln produces a hydrate which is quite finely divided and in loose, porous form. In the hot zone of the kiln the building up of grains from such material must be by accretion of myriads of fine particles which enter the hot zone from the drying and preheating zone. This building up of spheroids by accretion tends to form a porous grain of low density unless an excessively high temperature is used, say at least 3350° F. Much, if not most, of the time spent in the hot zone is thus utilized in building the grains up by accretion so that there is little time for shrinking them to their minimum possible bulk, i. e., to maximum grain density. In contrast, the material fed to the dead burning kiln in my process is dense and of low water content, and the water is driven out quickly in the kiln without disrupting the nodules so that they pass through the kiln with little breaking up and the particles enter the hot zone in the form of spheroids of low porosity so that their entire time of residence in the hot zone is utilized in shrinking them and producing periclase whereby the grains are of minimum volume and maximum density.

The production of periclase, which is the most dense form of magnesia, in the dead burning operation is, I believe, favored by the presence of magnesium and calcium chlorides which are contained in small amounts in the magnesium hydrate produced by the process of my copending application Serial No. 402,935. Ordinarily that material contains about 3 per cent of chlorine in the form of those chlorides, of which about 40 per cent is present as $MgCl_2$, and the balance as $CaCl_2$. Upon heating the former is rapidly decomposed into magnesia and hydrogen chloride, but the calcium chloride is more stable and is finally eliminated only in the hot zone of the kiln, possibly by decomposition to lime and hydrogen chloride, possibly by direct volatilization as such, and possibly by reaction with the alkali metal compounds, which may be present to a small extent, to produce volatile chlorides. The dense structure of the nodules may cause some residual hydrogen chloride resulting from decomposition of the magnesium chloride to be retained until they are in the hot zone of the kiln. I believe that the combination of these reactions results in catalyzing the transformation of magnesia into periclase, and as these grains are already interlocked in the dense structure, this helps to increase the density of the dead burned product. An advantage of the hydrate produced by my aforesaid process is that it naturally contains these mineralizers although, as will be understood, mineralizers might be added for the same purpose to a hydrate not containing them, and it will be understood also that in addition to these alkaline earth chlorides other chlorides might be used for the same purpose.

The invention may be understood further with reference to the accompanying flow sheet. Precipitated magnesium hydrate made according to the process of my aforesaid application, or a similar material, is formed into a cake and washed on a rotary vacuum filter 1. The cake is removed and a portion, suitably 50 to 65 per cent, usually about 55 per cent, is passed to a drier 2, such as a rotary kiln, where it is dried and gently calcined at a temperature not exceeding about 1000° F. Instead of a rotary kiln there may be used a dispersion drier, followed by a rotary kiln to do the calcining, or a dispersion drier or its equivalent may be used for performing both the drying and the calcining operations. The calcined magnesia may then be ground in a mill 3, preferably so that at least 95 per cent will then pass a 100-mesh screen, after which it is passed to a storage bin 4 from whence it may be withdrawn and passed to a suitable mixing device 5, such as a pug mill together with the remainder of the uncalcined hydrate.

There may be added to the material in mill 5 correcting agents, and for this purpose there are provided storage bins 6, 7 and 8, which contain respectively, ground clay, iron ore, and calcined dolomite. Other bins may be provided for other correcting materials necessary for bringing the final product to desired analysis.

The relative amounts of filter cake and calcined magnesia from bin 4 may be proportioned so as to reduce the water content of the material in mixer 5 to give a nodular product as a result of the mixing operation. However, to produce a dead burned magnesia of the highest possible density and the cleanest grain structure, I prefer to regulate the proportions of uncalcined filter cake and calcined magnesia so that the mix leaving the mill will be similar to the "stiff mud" used in the making of bricks by extrusion from an auger machine; the amounts of the two will depend on the water content of the cake, but with cakes made by the process of my aforesaid application the mix will usually contain from about 35 to 40 per cent of water. The mix is then passed from mill 5 to any suitable means for shaping it into appropriate sizes, for example, an auger machine 9 which forces it through a perforated die 10. The perforations in the die plate may suitably be ¾ inch in diameter, and the pugs are cut off in approximate lengths, suitably ¾ inch, by wires 11 which are carried by frames 12 that are so mounted as to act as a rotating wheel which is driven through suitable gearing by a variable speed motor 13.

The pugs, which are dense in structure, next are passed, as by a belt conveyor 14, into a rotating tube 15 where they are tumbled to round off the edges while the heat producing reaction sets in. Ordinarily, about 45 minutes residence in the tumbler is sufficient to round the nodules and permit completion of the reaction. While in the tumbler 15 the nodules become steaming hot, and they emerge from the tumbler as hard, strong pebble-like nodules that have been largely dried. These nodules are in themselves a new product, it being novel to provide magnesium hydrate in the form of dense, hard and autogenously bonded grains. Usually they contain not over about 15 per cent of water. Any tendency for the nodules to adhere to the walls of the tumbler or to form clumps may be counteracted by adding to the tumbler a little calcined magnesia from bin 4, or by adding a little fuel oil to coat the surfaces of the pebbles.

The reacted and hardened nodules may, if desired, be then passed to a bin 16 from which they are withdrawn according to need and passed to a dead burning kiln 17 in which they are converted at a maximum temperature not to exceed about 3100° F. into dead burned magnesia of high density. In passing the nodules into the rotary kiln it is preferred, for fuel economy in the kiln, to pass them as a bed over some form of perforated grate 18 through which a portion of the gases from the kiln is passed in an amount sufficient to substantially completely dry them, e. g., to a moisture content of about 0.15 to 0.2 pound per pound of solids. Also this preheats them somewhat. Only a relatively small portion of the exit gas from kiln 17 is used for this purpose, the remainder being preferably passed to the light calciner 2.

The following examples are illustrative of the densities obtainable in the practice of the invention as well as of the manner in which the composition of the product may be controlled through the use of correcting materials. The analyses of the dried clay and iron ore (Mesabi) were as follows:

|  | Clay | Iron ore |
|---|---|---|
| $SiO_2$ | 57.96 | 5.56 |
| $Al_2O_3$ | 20.84 | 1.53 |
| $Fe_2O_3$ | 6.60 | 72.50 |
| $TiO_2$ | 1.0 |  |
| CaO | 1.6 | 0.17 |
| MgO | 1.6 | 0.09 |
| Ignition loss | 6.70 | 6.65 |
| Alkalies, by difference | 3.7 |  |
| $H_2O$ |  | 13.05 |

*Example 1.*—To make 100 tons of dead burned magnesia of the following approximate analysis:

|  | Per cent |
|---|---|
| MgO | 85 |
| $SiO_2$ | 5 |
| $Al_2O_3$ | 2 |
| $Fe_2O_3$ | 5 |
| CaO | 3 | there are charged to the pug mill

|  | Tons |
|---|---|
| Ground dried clay | 6.5 |
| Ground iron ore | 4.5 |
| Calcined dolomite | 2.3 |
| Calcined magnesia | 47.5 |
| Uncalcined $Mg(OH)_2$ cake, dry basis | 58.0 |
| $H_2O$ in filter cake | 87.0 |

This material when processed as described and burned at not to exceed 3100° F. has a grain density in excess of 3.00.

*Example 2.*—To make 100 tons of dead burned magnesia of approximately the following analysis:

|  | Per cent |
|---|---|
| MgO | 92.0 |
| $SiO_2$ | 2.3 |
| $Al_2O_3$ | 0.7 |
| $Fe_2O_3$ | 2.5 |
| CaO | 2.5 | there are fed to the pug mill

|  | Tons |
|---|---|
| Ground dried clay | 1.4 |
| Ground iron ore | 1.8 |
| Calcined dolomite | 1.0 |
| Calcined magnesia | 53.5 |
| Uncalcined $Mg(OH)_2$ cake, dry basis | 64.2 |
| $H_2O$ in filter cake | 96.3 |

When processed as described above and burned at not to exceed 3100° F. this mix produces a dead burned magnesia having a grain density in excess of 3.15.

From what has been said it will be realized that the invention offers various and substantial advances in the art. Primarily, it provides dead burned magnesia having a grain density which suits it to the manufacture of magnesite bricks and for other refractory uses. Also, as compared with prior processes of making dead burned magnesia from precipitated hydrate, considerable economy results from the ability to burn at lower temperatures than have been indispensable heretofore. Economies result also from greater kiln output inasmuch as a kiln which will burn but 50 tons of hydrate slurry per day is capable of burning 150 tons per day of the autogenously hardened nodules described hereinabove.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. That method of making dense dead burned magnesia from moist precipitated magnesium hydrate which comprises lightly calcining a portion of said hydrate to produce a chemically reactive magnesia, mixing the said magnesia with a portion of the uncalcined moist hydrate, forming the mixture into nodules, drying and hardening said nodules by heat autogenously generated therein, and finally heating and calcining the hardened nodules at a temperature to produce dense dead burned magnesia.

2. That method of making dense dead burned magnesia from moist precipitated magnesium hydrate which comprises lightly calcining a portion of said hydrate at a temperature of not over about 1000° F. to produce a chemically reactive magnesia, mixing the said magnesia with a portion of uncalcined moist hydrate and forming the mixture into dense nodules, drying and hardening said nodules by heat autogenously generated therein, and finally dead burning the hardened nodules.

3. That method of making dense dead burned magnesia from moist precipitated magnesium hydrate which comprises diverting about 50 to 65 per cent of said hydrate and calcining it at a temperature of not over about 1000° F. to produce a chemically reactive magnesia, mixing said magnesia with the remainder of said moist hydrate and forming the mixture into dense nodules, drying and hardening said nodules by heat autogenously generated therein, and finally dead burning the hardened nodules.

4. That method of making dense dead burned magnesia from moist precipitated magnesium hydrate which comprises calcining a portion of said hydrate at a temperature of not over about 1000° F. to produce a chemically reactive magnesia, mixing said magnesia with uncalcined moist hydrate in an amount to provide a mixture containing about 35 to 40 per cent of water, forming the mixture into dense nodules, drying and hardening said nodules by heat autogenously generated therein, and finally dead burning the hardened nodules.

5. That method of making dense dead burned magnesia from moist precipitated magnesium hydrate which comprises calcining a portion of said hydrate at a temperature of not over about 1000° F. to produce a chemically reactive magnesia, mixing said magnesia with uncalcined hydrate to form a mixture containing about 35 to 40 per cent of water, forming the mixture into dense nodules, drying and hardening said nodules by heat autogenously generated therein, then drying the hardened nodules to reduce their water content to not over about 0.2 pound per pound of solids, and finally dead burning the hardened nodules.

6. That method of making dense dead burned magnesia from moist precipitated magnesium hydrate which comprises diverting about 50 to 65 per cent of said hydrate and calcining it at a temperature of not over about 1000° F. to produce a chemically reactive magnesia, grinding said magnesia to at least about 100-mesh, mixing the said ground magnesia with the remainder of said moist hydrate, forming the mixture into dense nodules, drying and hardening said nodules by heat autogenously generated therein, then drying the hardened nodules further, and finally dead burning the hardened nodules.

7. That method of making dead burned magnesia which comprises providing magnesium hydrate in moist condition containing a small amount of magnesium and calcium chlorides, calcining a portion of said hydrate at a temperature not over about 1000° F. to produce chemically reactive magnesia, mixing said magnesia with another portion of said moist hydrate and nodulizing the mixture, hardening the nodules by heat autogenously generated therein, and dead burning the hardened nodules.

8. That method of making dead burned magnesia which comprises providing magnesium hydrate in moist condition containing a small amount of magnesium and calcium chlorides, calcining a portion of said moist hydrate to produce chemically reactive magnesia, mixing said magnesia with another portion of said moist hydrate, forming shapes from said mixture and hardening and drying said shapes by heat autogenously generated therein, and dead burning the hardened shapes at a temperature to shrink them and form periclase.

9. That method of making dense dead burned magnesia from moist precipitated magnesium hydrate produced by calcining dolomite to convert the magnesium carbonate to magnesium oxide and the calcium carbonate to highly reactive lime, dry hydrating the calcine with a calcium chloride brine substantially free from magnesium chloride, and reacting the hydrate with an excess of a magnesium chloride brine of about 1.10 to 1.14 specific gravity at a temperature not over about 60° F. and thereby precipitating magnesium hydrate characterized by being rapid settling and easily filterable; said method comprising lightly calcining a portion of the moist hydrate to produce a chemically reactive magnesia, mixing said magnesia with a portion of the moist uncalcined hydrate and forming the mixture into nodules, hardening said nodules by spontaneous heat-liberating reaction therein, and finally dead burning the hardened nodules.

ROBERT D. PIKE.